Aug. 30, 1927.  
E. SUTTER  
1,640,860  
METHOD OF PACKING AND PRESERVING FOOD PRODUCTS  
AND THE PACKAGE OBTAINED THEREBY  
Filed April 30, 1923   2 Sheets-Sheet 1

Witnesses:
Emil Kayser
Robert Schaper

Inventor:
Ernst Sutter,
by Edward C. Saenett
Attorney.

Aug. 30, 1927.
E. SUTTER
1,640,860
METHOD OF PACKING AND PRESERVING FOOD PRODUCTS
AND THE PACKAGE OBTAINED THEREBY
Filed April 30, 1923    2 Sheets-Sheet 2
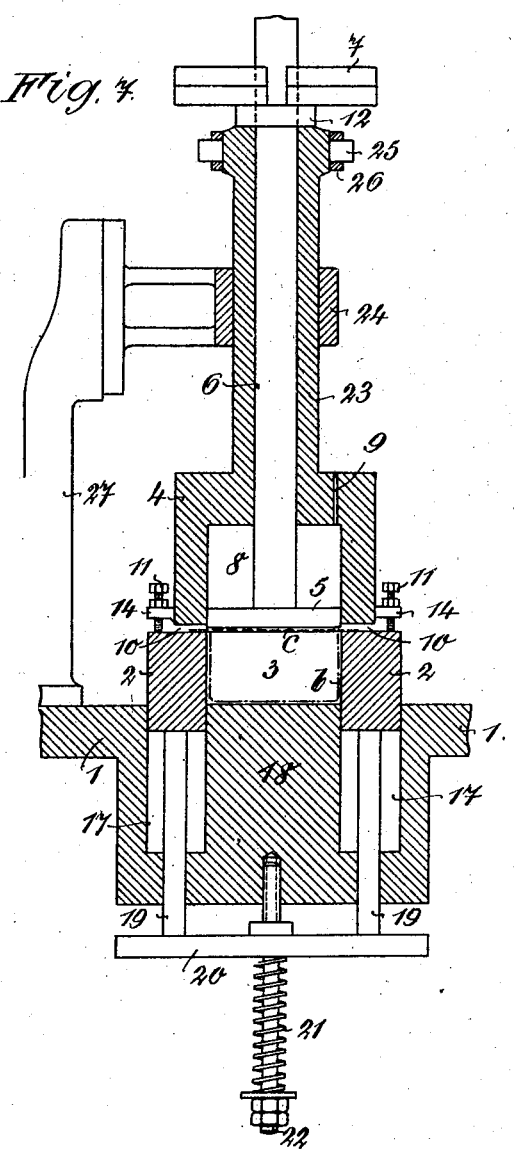
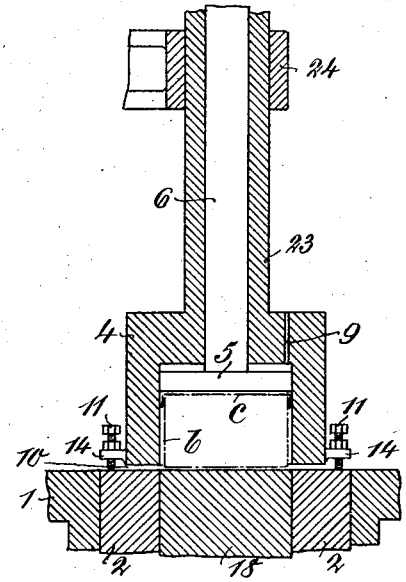
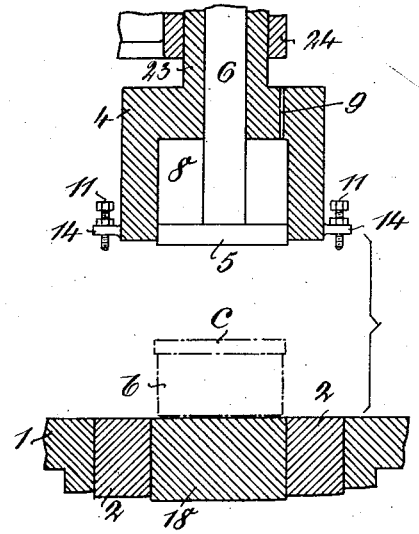
Witnesses:
Emil Kayser
Robert Schaper
Inventor:
Ernst Sutter
by:
Edward C. Sarratt
Attorney.

Patented Aug. 30, 1927.

1,640,860

UNITED STATES PATENT OFFICE.

ERNST SUTTER, OF BURGDORF, SWITZERLAND, ASSIGNOR TO ALPINA KÄSE A.-G., OF BURGDORF, BERNE, SWITZERLAND, A CORPORATION OF SWITZERLAND.

METHOD OF PACKING AND PRESERVING FOOD PRODUCTS AND THE PACKAGE OBTAINED THEREBY.

Application filed April 30, 1923, Serial No. 635,638, and in Switzerland May 19, 1922.

My invention relates to improvements in the method of packing and preserving food products and the package obtained thereby. More particularly my invention relates to food products such as cheese which are easily spoiled by germs. I have found that cheese and similar food products can be stored for a considerable length of time if care is taken that when packing air is excluded from the food products and the packing is such that the access of air to the food products is prevented. Therefore the object of the improvements is to provide a method of packing cheese and the like in flexible wrappers such as tin foil, paper, or prepared hog's bladder in such a way that in packing the air is expelled from the wrapper and that the wrapper is closed so that the air has no access to the food product. With this object in view my invention consists in filling the food product into a box made from the flexible wrapper in a plastic or liquid state and up to the upper margin of the box, placing a sheet of the wrapper on the surface of the food product, applying pressure to the wrapper and to the food product confined therein for expelling the air, and bending the projecting margin of the sheet downwardly and on the upper parts of the side wall of the box. In the preferred method the cheese is first brought into a liquid or semi-liquid state and poured into the box formed from the wrapper, so that the said box is completely filled out by the cheese and most of the air is expelled from the box before placing the top sheet thereon. I have found that by applying the top sheet on the box under pressure any air confined between the body of the food product and the wall of the box and the top sheet thereof is expelled, and that by bending the margin of the top sheet around the side wall of the box while the food product is under pressure a tight joint is insured. In the practice of the invention I place the box into a matrix before applying the pressure thereto, which matrix has the function to support the flexible wrapper as against the internal pressure.

Figure 1:
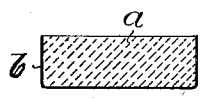
Figure 2:
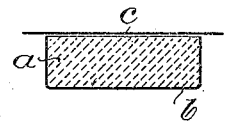
Figure 3:
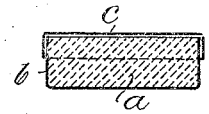
Figure 4:
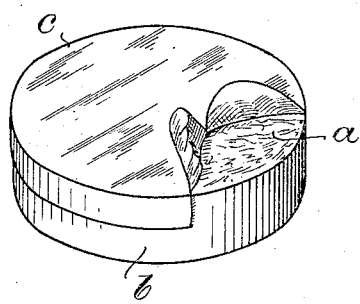
Figure 5:
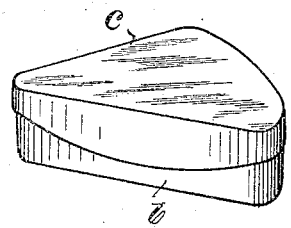
Figure 6:
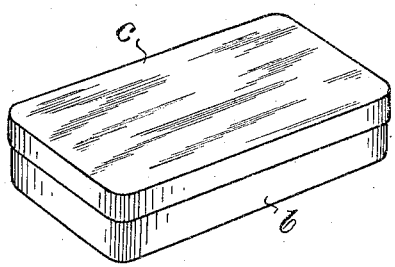

In order that my invention be more clearly understood the package and an apparatus suitable for putting the method into effect have been shown in the accompanying drawings, in which the same reference characters have been used in all the views to indicate corresponding parts. In said drawings, Fig. 1, is a vertical section showing the box filled with the food product, Fig. 2, is a similar section showing the said box with the covering sheet put thereon, Fig. 3, is a similar section showing the covering sheet bent over the side wall of the box, Figs. 4 to 6, are perspective views showing various forms of the package, Fig. 7, is an elevation partly in section showing an apparatus suitable for making the package, and Figs. 8 and 9, are detail sectional views showing the main parts of the apparatus in different positions.

In carrying out my improved method I first make a box of the desired form and size from a suitable flexible wrapper such as tin foil, and I place the said wrapper into a matrix providing a backing for the walls of the box. Thereafter I fill the food product into the box up to the upper margin thereof as is shown in Fig. 1, where $a$ is the box made from the wrapper and $b$ the food product. The food product may be either in a plastic state, in a semi-liquid state, or in a liquid state. Preferably however I fill the same into the box in a semi-liquid state, because thereby the whole box is entirely filled out and no air is left on the wall thereof. In such cases in which the food product is solid at ordinary temperature I transform the same into liquid state by heating or in another way. After thus filling the food product into the box $b$ I place a sheet $c$ made from the wrapper material on the top of the food product so that the margin of the sheet projects beyond the box. Finally I apply pressure to the box and the top sheet thereof and I bend the margin of the top sheet downwardly and around the upper part of the side wall of the box while maintaining the pressure. By thus applying pressure to the package prior to bending the margin of the sheet $c$ downwardly any air confined between the sheet or the wall of the box and the food product is expelled, and by bending the margin of the sheet downwardly while the food product is still under pressure a tight joint is produced between the downwardly bent portion of the top sheet and the side wall of the box.

The box may have any desired form. In Figs. 4 to 6 I have shown boxes of circular, sector-like and rectangular form.

In Figs. 7-9 I have shown an apparatus which is suitable for putting my improved method into effect. As shown in the said figures the apparatus comprises a table 1 having an annular socket 17 formed therein, which socket provides a bottom support 18 for the box, said support having the form of the package to be made by the apparatus. Within the socket 17 a matrix in the form of a ring 2 is guided which nicely fits therein and is supported by means of rods 19 and a cross bar 20 bearing on a spring 21 provided on a rod 22 secured to the bottom part of the table 1. Above the ring 2 there is a patrix in the form of a hollow plunger 4 the internal area of which corresponds to the internal area of the ring 2 and the reduced upper part 23 of which is guided in a bracket 24 mounted on a suitable part of the machine. To show what may be done the said bracket is secured to an upright 27 rising from the table 1. The upper part of the cavity 8 of the plunger 4 communicates through a vent 9 with the outer air. At its bottom end the plunger 4 is formed with three ears 14 having screws 11 screwed therethrough, which screws have the function to arrest the plunger 4 moving downwardly a suitable distance away from the ring 2, said distance being a few tenths of a millimeter. At the top end the plunger 23 is formed with trunnions 25 engaged by an operating lever 26 for moving the plunger 4 upwardly or downwardly. Within the cavity 8 of the plunger 4 a piston 5 is guided the rod 6 of which projects upwardly through an axial bore of the reduced portion 23. Above the reduced portion 23 the rod 6 carries a collar 12 providing a support for a suitable number of weights 7.

The operation of the apparatus is as follows: When the parts are in the positions shown in Fig. 7 the plunger 4 is lifted upwardly by means of the operating lever 26 and a box 3 of tin foil or the like is placed into the matrix provided by the bottom support 1 and the ring 2, the dimensions of the parts being such that the walls of the matrix provide a backing for the walls of the box, and that the edge of the box is flush with the top face of the ring 2 or slightly below the same. Now a suitable amount of the food product preferably in a liquid or semi-liquid state is filled into the box which is thereby filled exactly to the upper margin thereof. Now a sheet of the wrapper is placed on the box with the margin projecting beyond the same and bearing on the top face of the ring 2. The plunger 4 is moved downwardly by means of the operating lever 26, until the screws 11 bear on the top face of the ring 2. In this position the plunger 5 weighted by the bodies 7 bears on the sheet c and the body of food product contained within the box b. Thereby the air confined between the food product and the sheet and the box is expelled, and it escapes through the minute annular passage provided between the top face of the ring 2 and the margin of the sheet c. Now the plunger 23 is forced downwardly, and it carries along the ring 2 against the action of the spring 21. The mass of food product and the box b are supported on the part 18 of the table, so that the projecting margin of the sheet c is bent downwardly and around the top part of the side wall of the box b. In this operation the weighted piston 5 and the air compressed within the chamber 8 act on the mass of food product so that the upper margin of the side wall of the box is pressed by internal pressure against the downwardly directed margin of the sheet c so as to produce a tight joint. Finally the parts are in the position shown in Fig. 8 and they are held in this position for a short period of time. Thereafter the plunger 4 is rapidly elevated, the ring 2 being for the present locked in depressed position. By the upward movement of the plunger 4 a vacuum is produced within the chamber 8, because the vent 9 permits only a slow admission of air to the chamber 8. By the said vacuum the downward pressure of the piston 5 is reduced, so that the body of food product within the wrapper is not pressed out of shape. As soon as the ring 4 has released the packed body of the food product the top face of the reduced portion 23 engages the collar 12 and retracts the piston 5 from the body of food product. Now the parts are in the position shown in Fig. 9 the wrapped body of food product being supported on the table 1 and the ring 2 being within the socket 17. Now a box of solid material such as wood is placed over the body of food product, before the liquid mass has time to deform the wrapper. Finally the body of food product is removed from the table together with the solid box enclosing the same.

While in describing the invention reference has been made to a particular example embodying the same I wish it to be understood that my invention is not limited to the specific feature of the method described herein.

I claim:

1. The method of packing food products, which consists in completely filling an open receptacle with the material in a plastic state, placing a thin-non-elastic sheet of metal over the material with its edges extending beyond the brim of the receptacle, subjecting to pressure the entire surface of the sheet above the material to expel air and then bending the edges of the sheet down and tightly against the sides of the receptacle.

2. The method of packing food products, which consists in introducing the material in a plastic state into an open receptacle composed of thin non-elastic metal, placing a thin non-elastic sheet of metal over the material with its edges extending beyond the brim of the receptacle, subjecting to pressure the entire surface of the sheet above the material while confining the receptacle against deformation, and then bending the edges of the sheet down and tightly against the sides of the receptacle.

3. The package produced by the method described herein, consisting of a box formed of thin non-elastic metal, a body of the food product within said box, and a covering of thin non-elastic metal closely covering said body and having its margin bent over the side wall of the box and in tight engagement therewith.

In testimony whereof I hereunto affix my signature.

ERNST SUTTER.